(12) United States Patent
Donner et al.

(10) Patent No.: US 7,076,211 B2
(45) Date of Patent: Jul. 11, 2006

(54) WIRELESS SENSOR ALERTS

(75) Inventors: Peter J. Donner, deceased, late of Espoo (FI); by Jan Donner, legal representative, Espoo (FI); Jan J. Donner, Espoo (FI); Mika T. Korpi, Helsinki (FI); Mikael J. Donner, Oitbacka (FI)

(73) Assignee: Electronic Data Systems Corporation, Plano, TX (US)

( * ) Notice: Subject to any disclaimer, the term of this patent is extended or adjusted under 35 U.S.C. 154(b) by 244 days.

(21) Appl. No.: 10/685,284

(22) Filed: Oct. 14, 2003

(65) Prior Publication Data

US 2005/0079880 A1      Apr. 14, 2005

(51) Int. Cl.
*H04B 7/00* (2006.01)

(52) U.S. Cl. .............. 455/41.2; 455/404.1; 455/404.2; 455/456.1; 455/414.1; 455/414.2; 340/506; 340/539.14; 340/539.26; 340/540

(58) Field of Classification Search .. 455/404.1–404.2, 455/456.1–457, 414.1–414.2, 432.1, 41.2; 340/506, 539.14, 539.26–539.27, 540–542, 340/545.1, 545.9–546
See application file for complete search history.

(56) References Cited

U.S. PATENT DOCUMENTS

| | | | | |
|---|---|---|---|---|
| 5,483,224 A * | 1/1996 | Rankin et al. | ......... | 340/539.17 |
| 5,499,014 A * | 3/1996 | Greenwaldt | ............ | 340/539.11 |
| 6,011,967 A * | 1/2000 | Wieck | ...................... | 455/404.1 |
| 6,049,272 A * | 4/2000 | Lee et al. | ............... | 340/539.18 |
| 6,094,140 A * | 7/2000 | Parente | ..................... | 340/573.1 |
| 6,215,405 B1 * | 4/2001 | Handley et al. | ............ | 340/584 |
| 6,255,944 B1 * | 7/2001 | Addy | ....................... | 340/539.3 |
| 6,331,816 B1 * | 12/2001 | Myllymaki | .................. | 340/540 |
| 6,437,692 B1 * | 8/2002 | Petite et al. | ................. | 340/540 |
| 6,542,076 B1 * | 4/2003 | Joao | .......................... | 307/10.2 |
| 6,667,688 B1 * | 12/2003 | Menard et al. | ............. | 340/531 |
| 6,741,174 B1 * | 5/2004 | Rhoades et al. | ............ | 340/540 |
| 2002/0008619 A1 * | 1/2002 | Lerg et al. | ................... | 340/540 |
| 2002/0067253 A1 * | 6/2002 | Trajkovic et al. | ........... | 340/506 |
| 2002/0080029 A1 * | 6/2002 | Menard et al. | ............. | 340/541 |
| 2002/0103758 A1 * | 8/2002 | Powell | ........................ | 705/51 |
| 2002/0126009 A1 * | 9/2002 | Oyagi et al. | ................. | 340/541 |

OTHER PUBLICATIONS

Chutiporn Anutariya, Vilas Wuwongse, and Vichit Wattanapailin, "An Equivalent-Transformation-Based XML Rule Language,", Jun. 2002, Proceedings of the International Workshop on Rule Markup Languages for Business Rules on the Semantic Web, Sardinia, Italy, pp. 1-15.

(Continued)

*Primary Examiner*—Steve M. D'Agosta
(74) *Attorney, Agent, or Firm*—Fish & Richardson P.C.

(57) ABSTRACT

Techniques are provided for wireless sensor alerts. In certain implementations, wireless sensor alerts may be facilitated by a process at a wireless device. The process may include detecting a signal representing an environmental state in the vicinity of the wireless device, comparing the environmental state represented by the signal against a set of remotely programmable rules at the wireless device, and, if the environmental state satisfies at least one of the rules, generating a communication for transmission to a wireless network based on the satisfied rule.

35 Claims, 5 Drawing Sheets

OTHER PUBLICATIONS

KR, Knowledge Representation Laboratory, "*Publications*," http://kr.cs.ait.ac.th/Publications/, pp. 1-5.

Fortec, Benefon OYJ, IfADo, IMS, Stakes, "*MORE-D11 Report*", Mar. 2000, DE 3006 MORE Mobile Rescue Phone, pp. 1-72.

Fortec Rehabilitation Technology, MObile REscue Phone, "*Telematics for disabled & elderly people*," http://www.fortec.tuwien.ac.at/reha/e/projects/more/more.html, Aug. 2001,pp. 1-5.

Fortec Rehabilitation Technology, MObile REscue Phone, "*Overview: The MORE System (MSY)*," http://www.fortec.tuwien.ac.at/reha.e/projects/more/results.html, Dec. 2000, pp. 1-14.

Cover Pages Hosted by OASIS, "*Extensible Stylesheet Language (XSL)*," http://xml.coverpage.org/xsl.html, Dec. 2003, pp. 1-110.

KR, Knowledge Representation Laboratory, "*About XET*," http://kr.cs.ait.ac.th/xet/, Jan. 2003, pp. 1-2.

KR, Knowledge Representation Laboratory, "*About ET*," http://kr.cs.ait.ac.th/et, Nov. 2002, pp. 1-2.

W3C, Tim Bray, Jean Paoli, C. M. Sperberg-McQueen, Eva Maler, "*Extensible Markup Language (XML) 1.0 (Second Edition)*," Oct. 2000, pp. 1-58.

KR, Knowledge Representation Laboratory, "*About XDD Theory*," http://kr.cs.ait.ac.th/XDD/, Sep. 2002, pp. 1-2.

KR, Knowledge Represenation Laboratory, "*@Knowledge Representation*," http://kr.cs.ait.ac.th/, Sep. 2002, pp. 1.

W3C, James Clark, "*XSL Transformations (XSLT) Version 1.0*," Nov. 1999, pp. 1-102.

W3C, Sharon Adler, Anders Berglund, Jeff Caruso, Stephen Deach, Paul Grosso, Eduardo Gutentag, Alex Milowski, Scott Parnell, Jeremy Richman, and Steve Zilles, "*Extensible Stylesheet Language (XSL) Version 1.0*," Oct. 2000, pp. 1-350.

NOKIA, "*Developer Platform 1.0 for Series 40 and Series 60: Specification*," Version 1.0; Nov. 2003, pp. 1-140.

NOKIA, "*MIDP 2.0 Introduction*," Version 1.0, May 2003, pp. 1-23.

NOKIA, "*Browsing on Mobile Devices*," copyright 2002, pp. 1-12.

NOKIA, "*Frequently Asked Questions*," http://www.nokia.com/nokia/0.5184.2776.00.html, pp. 1-5.

NOKIA, "*Creating MIDlets with Borland Jbuilder or Sun ONE Studio and Nokia Developer'Suite for J2ME,*" Version 1.2, Jun. 2003, pp. 1-22.

\* cited by examiner

US 7,076,211 B2

WIRELESS SENSOR ALERTS

TECHNICAL FIELD

This description relates to sensors, and more particularly, to wireless sensor alerts.

BACKGROUND

Sensors for warning of dangerous conditions in buildings are becoming more and more common. For example, motion detectors and/or smoke detectors are now typically found in most houses. These sensors are often connected to a centralized control device in the building. The control device can activate a local alarm and/or notify a central monitoring facility if an emergency condition is detected.

SUMMARY

In one general aspect, a process at a wireless device may provide wireless sensor alerts. The process may include detecting a signal representing an environmental state in the vicinity of the wireless device and comparing the environmental state represented by the signal against a set of remotely programmable rules at the wireless device. The signal may represent any appropriate environmental state, such as, for example, sound level. If the environmental state satisfies at least one of the rules, the process calls for generating a communication for transmission to a wireless network based on the satisfied rule. The communication may be a Short Message Service message or any other appropriate communication and may be destined for a second wireless device. The process may be facilitated by one or more machines, by an article including a machine-readable medium storing instructions operable to cause one or more machines to perform operations, and/or by any other appropriate technique. The wireless device may, for example, be a cellular telephone.

Particular implementations may include detecting the environmental state and generating the signal representing the environmental state. Furthermore, the environmental state represented by the signal may be identified. In certain implementations, identifying the environmental state represented by the signal may include determining an environmental condition associated with the state and determining a level of the environmental condition.

The rules may have a variety of different formats. For example, a rule may include multiple conditions that must be satisfied. As another example, a rule may specify a level that an environmental state must exceed for the rule to be satisfied. As a further example, a rule may specify multiple communications for an environmental state.

Certain implementations may include detecting a request to modify the programmable rules, determining whether parameters for a rule have been received, and, if the parameters have been received, modifying the rules. Modifying the rules may include adding a new rule based on the received parameters. The request may be from a second wireless device.

Particular implementations may include detecting a request to open a voice channel in response to the communication and establishing the voice channel using the wireless device.

In another general aspect, a framework for wireless sensor alerts is provided. The framework may include a rule set, a rule editor, and a rule engine. The rule set may include programmable rules that specify conditions under which communications are to be sent based on an environmental state in the vicinity of a wireless device and the communications to be sent. The rule editor may be operable to modify the rules in the rule set based on received rule parameters. The rule engine may be operable to receive a proposition for a rule, the proposition representing an environmental state in the vicinity of a wireless device, and to compare the proposition against the rules. The environmental state may include an environmental condition and a level of the environmental condition. If the proposition satisfies a condition of at least one of the rules, the rule engine may be operable to determine a communication for transmission to a wireless network based on the satisfied rule. The communication may be destined for a second wireless device.

The rules may have a variety of different formats. For example, a rule may include multiple conditions that must be satisfied. As another example, a rule may specify a level that an environmental state must exceed for the rule to be satisfied.

In particular implementations, the rule editor is operable to detect a request to modify the programmable rules, determine whether parameters for a rule have been received, and, if the parameters have been received, modify the rules.

In another general aspect, a system for wireless sensor alerts includes a wireless network, a first wireless telephone, and a second wireless telephone. The wireless network is operable to receive communications from and send communications to wireless telephones, and the first wireless telephone and the second wireless telephone are operable to wirelessly send communications to and receive communications from the wireless network. The first wireless telephone includes a sensor operable to detect an environmental state in the vicinity of the wireless telephone and to generate a signal representative thereof. The first wireless telephone also includes a microprocessor coupled to the sensor. The microprocessor is operable to detect the signal, to generate a rule proposition based on the signal, the proposition specifying an environmental condition and level associated with the state, and to compare the rule proposition to rules in a remotely programmable rule database to determine whether the proposition satisfies a condition of a rule. If the proposition satisfies a condition of a rule, the microprocessor is operable to determine, based on the satisfied rule, a message for communication to the second wireless telephone, to determine whether a communication regarding opening a voice channel in response to the message has been received from the second wireless telephone, and, if the communication has been received, to open a voice channel to the second wireless telephone. The microprocessor is further operable to detect a request to modify the programmable rules, determine whether parameters for a rule have been received, and modify the rules if the parameters have been received. The first wireless telephone also includes a transceiver coupled to the processor and operable to send the message to the wireless network. The second wireless telephone is operable to receive the message from the first wireless telephone, to visually present the message, and to determine whether a user desires to open a voice channel to the first wireless telephone in response to the message. If a user desires to open a voice channel in response to the message, the second wireless telephone is operable to send the communication regarding opening a voice channel to the wireless network for communication to the first wireless telephone. The second wireless telephone is further operable to visually present a user interface for modifying the rules, detect user commands indicating parameters for a rule, and send a communication containing the parameters to the wireless network for conveyance to the first wireless telephone.

The details of one or more implementations of the invention are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Wireless sensor alerts may be provided by a wireless telephone operable to sense one or more environmental states in the vicinity of the telephone and, based on a set of programmable rules, to alert other wireless telephones if an environmental state is of interest. This capability is useful for personal security, building monitoring, and a variety of other goals. However, as explained below, wireless sensor alerts may be provided by a variety of other devices and may have a variety of other features.

Figure 1:
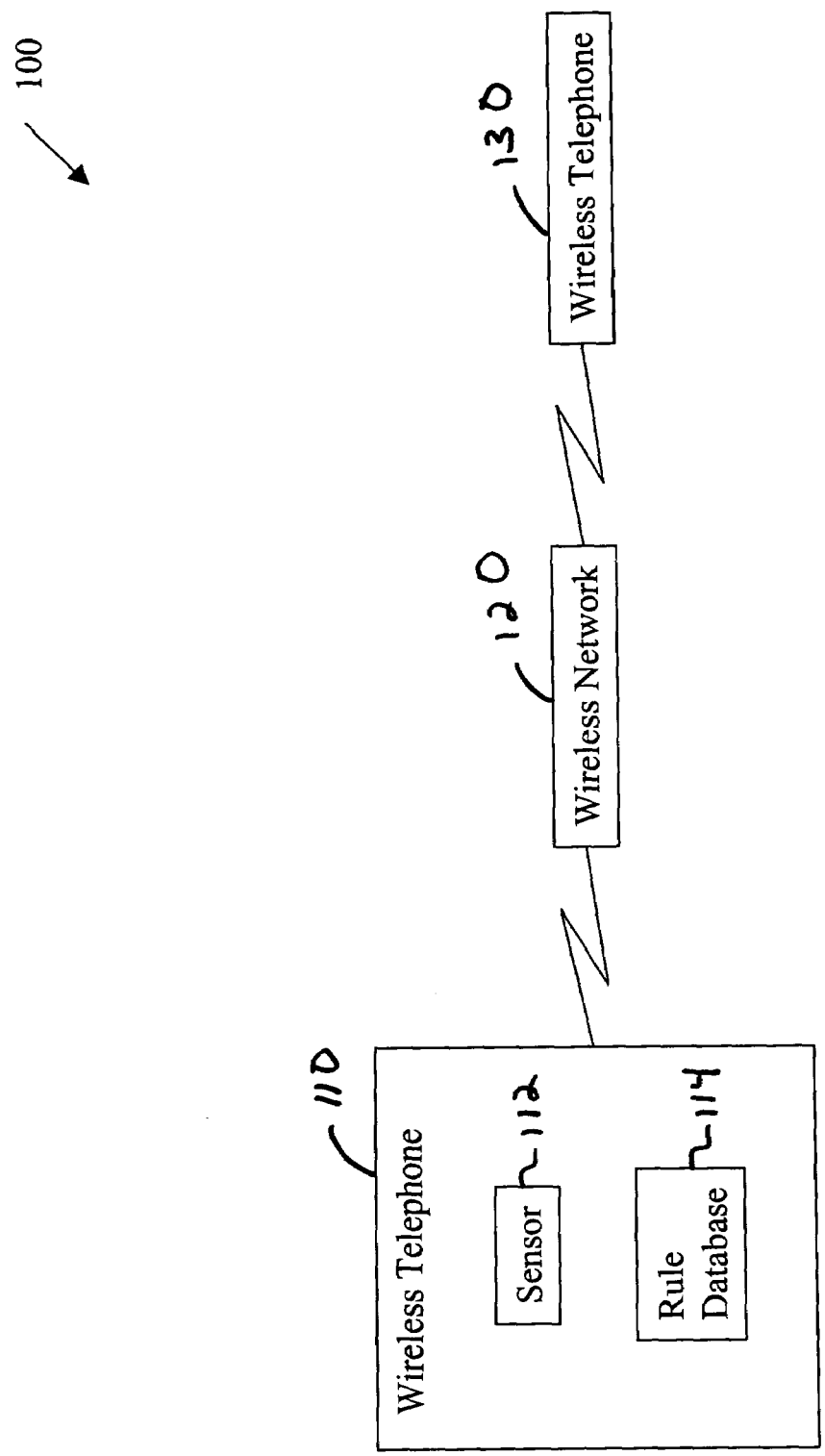
FIG. 1 is a block diagram illustrating a system for wireless sensor alerts.

FIG. 1 illustrates a system 100 for wireless sensor alerts. In general, system 100 includes a wireless telephone 110, a wireless network 120, and a wireless telephone 130. Wireless telephone 110 is operable to detect at least one environmental state in its vicinity and, based on a set of programmable rules, to determine whether the state is of interest. If the state is of interest, wireless telephone 110 generates a communication for wireless telephone 130 and sends the communication to wireless network 120. Wireless network 120 conveys the communication to wireless telephone 130, where a user may be notified of the communication and may take appropriate action based on the communication.

In more detail, wireless telephone 110 includes a sensor 112 and a rule database 114. Sensor 112 is operable to detect an environmental state and report on the environmental state. The environmental state is then compared against rule database 114, and, if one of the rules in database 114 is satisfied, a communication is generated according to the satisfied rule. The communication may be a text message, a request to open a voice channel, or any other appropriate communication. Text messages may be sent using Short Message Service (SMS), Enhanced Message Service (EMS), General Packet Radio Service (GPRS), or any other appropriate messaging service. Furthermore, the messaging service may use any appropriate protocol, such as, for example, the Wireless Application Protocol (WAP) or the Simple Object Access Protocol (SOAP). Requests to open a voice channel may be sent by using standard wireless network techniques.

Sensor 112 may be of any appropriate type. For example, the sensor may be an audio sensor. Thus, if a loud noise is detected (e.g., greater than 100 dB), wireless telephone 110 may generate an appropriate communication. For instance, if a person yells for help and does not reverse the call in an appropriate period of time (e.g., three seconds), the telephone may send a communication to a friend, a security company, and/or a police station, depending on the rules.

As another example, the sensor may be a movement and/or distance sensor. Such a sensor may be used to detect intruders, time events, or otherwise.

As an additional example, the sensor may be a slip sensor. Such a sensor may be used, for example, to alert a teacher when every student has entered class. Furthermore, the number of students could be delivered to principal or the fire department, in case there is ever a fire alarm and the building needs to be evacuated.

As a further example, the sensor may be a Bluetooth™ sensor. Such a sensor may be used, for example, to pick up votes that meeting participants have cast from their mobile telephones (e.g., yes, no, or empty) and show the tally.

As another example, the sensor may be a smoke sensor or a temperature sensor. With such a sensor, if a fire were to occur, the wireless telephone may send a communication to the property owner, the police department, the fire department, and/or any other appropriate party.

As an additional example, the sensor may be a position sensor (e.g., a Global Positioning System (GPS) sensor). With such a sensor, if the wireless telephone moves into and/or out of a designated area, the telephone may send a communication. This may be useful for delivery companies, parents, and the like. A position sensor may also be used to provide the position of the wireless telephone if another type of sensor is activated. The position may be used for directing emergency personnel to the wireless telephone.

As a further example, the sensor may be a medical sensor, such as, for example, a heart-beat sensor. Thus, if irregularities occur, friends, family, health care providers, emergency personnel, and/or others may receive alerts.

Appropriate sensors may include those from companies such as VTT Technical Research Centre in Finland and AT&T in the United States.

Rule database 114 contains rules that express the conditions under which communications should be sent from wireless telephone 110. For example, rules 114 may contain thresholds for sensor readings. Thus, if a threshold (e.g., sound level over 80 dB) is met, a communication is sent. The rules may be expressed as if-then statements or any other appropriate logical construct. Rule database 114 also allows the rules to be programmed. The rules may be programmed locally at wireless telephone 110 and/or remotely using wireless telephone 130.

Wireless telephone 110 may be a cellular telephone, whether mobile or non-mobile, or any other appropriate device that can access wireless network 120. Wireless network 120 may be a Global System for Mobile (GSM) system, a Personal Communications Service (PCS) system, or any other appropriate type of wireless system. Wireless telephone 130, in turn, may be a cellular telephone, whether mobile or non-mobile, or any other appropriate device that can access wireless network 120. Wireless telephone 110 and wireless telephone 130 may communicate with wireless network 120 by well-known techniques.

System 100 has a variety of features. For example, sensor-activated communications may be implemented without any enhancements to the wireless network. Thus, the system may be implemented in existing wireless networks without having to make major structural changes to the network. As a result, wireless sensor alerts may be used in most wireless networks, which allows users to roam freely if they so desire. As another example, the system provides flexibility to its users. In particular, because the rules in database 114 are programmable, a user may turn sensors on and off, adjust thresholds for sensor readings, adjust communication options, and/or make any other appropriate modification to the rule parameters. As a further example, because communication may be accomplished using widely-accepted standards, alerts may be received at most any wireless telephone, which makes the system robust for its users. Moreover, improvements to wireless telephones having sensors should not make other wireless telephones having sensors obsolete. Furthermore, old wireless telephones having sensors and new wireless telephones having sensors may be compatible with each other.

Although FIG. 1 illustrates a system for wireless sensor alerts, other implementations may include less, more, and/or a different arrangement of components. For example, a wireless network may allow communication to additional wireless telephones or other wireless devices, such as, for example, wireless-capable personal digital assistants (PDAs) and/or wireless-capable personal computers (PCs).

As another example, a wireless network may allow communication to a land-based network, such as, for example, the Internet or the Public Switched Telephone Network (PSTN). Thus, a communication, such as, for example, a text message, may be sent to a wired device instead of, or in addition to, wireless telephone 130. Furthermore, the rules may be programmed from such a device.

As an additional example, a wireless telephone may have more than one sensor. Each sensor may be associated with one or more rules for determining when a communication is to be sent based on conditions detected by the sensor.

As a further example, a wireless telephone may include devices for recording environmental states at the wireless device. For example, the wireless telephone may include an audio recorder, a camera, and/or a video recorder. These devices may be activated in response to a rule being satisfied and/or in response to a command from the alerted device.

In particular implementations, the rules may specify more than one communication for a given condition. For example, if a threshold is exceeded for a smoke sensor, a communication may be sent to a building owner, building security, and the fire department. The various communications may be expressed in the same rule or in individual rules. Furthermore, one or more rules may contain more than one condition that must be satisfied before a communication will be sent. For instance, a rule may specify that an alert is to be sent if motion is detected and sound over 80 db is detected.

In certain implementations, wireless telephone 130 is able to open a voice channel to wireless telephone 110 in response to an alert communication. Thus, a user of wireless telephone 130 is able to listen to the environment around wireless telephone 110. This may allow a user to determine whether an actual emergency exists. In particular implementations, the channel may be opened silently. That is, the voice channel may be opened without the alerting telephone ringing, vibrating, and/or generating any other noticeable type of external indication. Furthermore, the channel may be a one-way voice channel, from the alerting telephone to the alerted telephone. Particular implementations may include opening an image and/or video channel. The audio data and/or visual data may further be directed to an e-mail account or other repository, as directed by the user of wireless telephone 130 or according to a rule. Thus, in general, remote wireless devices may use the sensors of wireless telephone 110.

It should be noted that system 100 may have more than one wireless telephone similar to wireless telephone 110 and more than one wireless telephone similar to wireless telephone 130. If system 100 has more than one wireless telephone similar to wireless telephone 110, these wireless telephones may cooperate with each other through transitive executions. For example, if one of these wireless telephones detects an environmental state that is of interest, the telephone may send a communication to another one of these wireless telephones. The receiving wireless telephone may combine the information from the first wireless telephone with information from its sensors and send the information to any appropriate type of device. Moreover, the receiving wireless telephone may gather information from other ones of these wireless telephones and combine the information.

Figure 2:
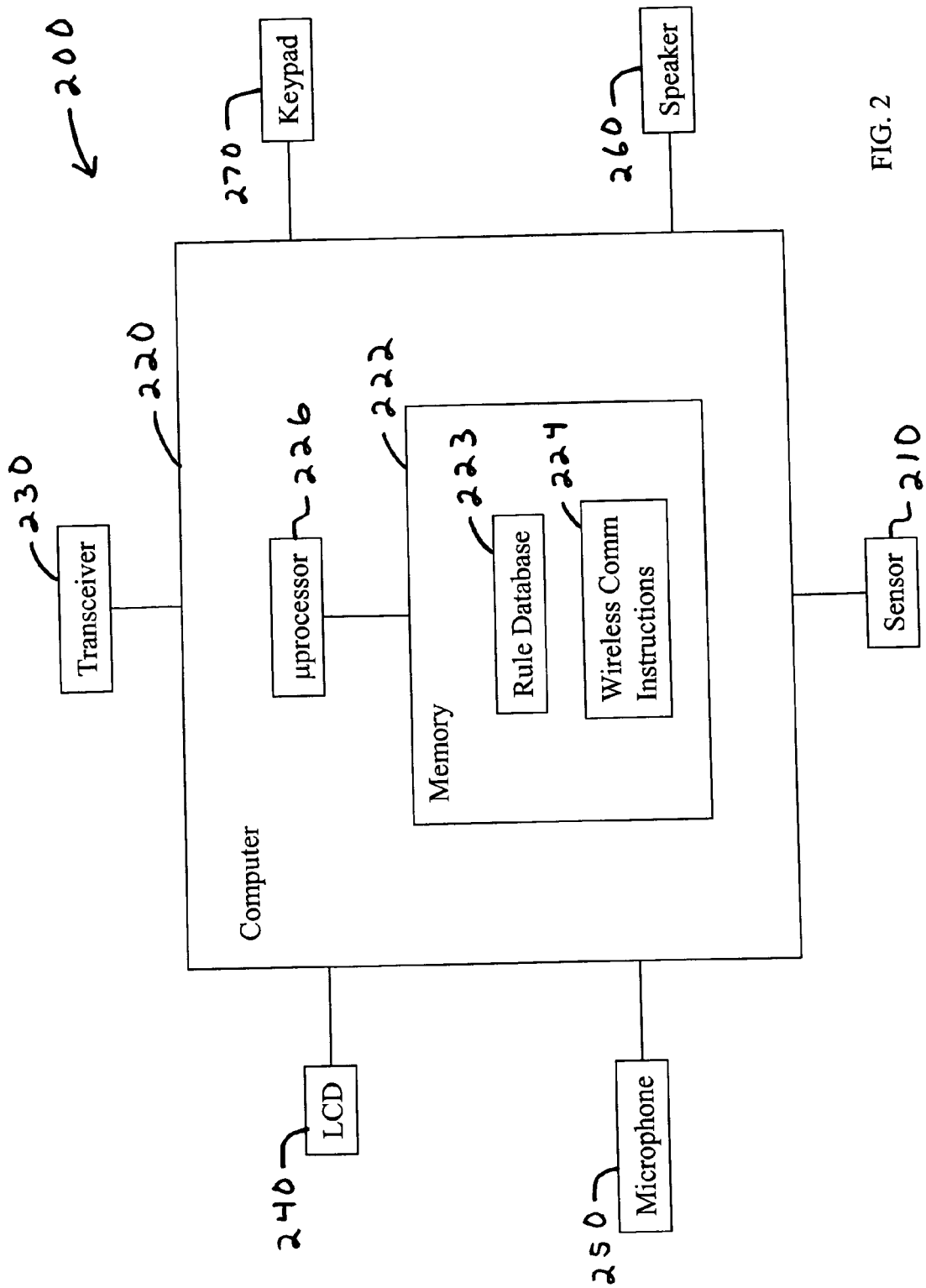
FIG. 2 is a block diagram illustrating a wireless telephone for FIG. 1.

FIG. 2 illustrates a wireless telephone 200 that represents one implementation of wireless telephone 110 in system 100. Wireless telephone 200 includes a sensor 210, a computer 220, and a transceiver 230. Sensor 210 is responsible for detecting an environmental state and reporting it to computer 220. Computer 220 is responsible for identifying the reported environmental state and determining whether the reported environmental state is of interest. Identifying the reported environmental state may include determining an environmental condition (e.g., sound, smoke, or motion) for which the report was issued and/or the level of the environmental condition. If the environmental state is of interest, computer 220 generates a communication and sends the communication to transceiver 230, which wirelessly sends the communication to a wireless network.

Computer 220 includes memory 222 and microprocessor 226. Memory 222 may include read-only memory (ROM), random-access memory (RAM), compact-disk read-only memory (CD-ROM), registers, and/or any other appropriate volatile or non-volatile information storage device. Microprocessor 226 may be a complex instruction set computer (CISC), a reduced instruction set computer (RISC), or any other appropriate digital logic device.

Memory 222 includes rule database 223 and wireless communication instructions 224. Rule database 223 contains the rules for responding to detections by sensor 210, as well as instructions for accessing and editing the rules. Wireless communication instructions 224 specify how device 200 is to interoperate with a wireless network. Microprocessor 226 operates according to the instructions in memory 222.

Wireless telephone 200 also includes a liquid crystal display (LCD) 240, a microphone 250, a speaker 260, and a keypad 270. LCD 240, a type of visual output device, is operable to visually present information to a user based on information from computer 220. Microphone 250, a type of audio input device, is operable to detect a user's voice and generate a signal representative thereof for computer 220. Speaker 260, a type of audio output device, is operable to receive a signal representative of a voice or other sound from computer 220 and generate the voice or other sound. Keypad 270, a type of user-manipulable input device, is operable to detect manipulation by a user and generate a signal that represents the manipulation for computer 220.

Although FIG. 2 illustrates a wireless telephone for system 100, other wireless devices usable in system 100 may have fewer, additional, and/or a different arrangement of components. For example, a wireless device may not have a visual output device, an audio input device, an audio output device, and/or a user-manipulable input device. As another example, a wireless device may include additional user-manipulable devices, such as buttons, switches, and the like. As a further example, a wireless device may include indicators, such as LEDs. Furthermore, some or all of the instructions in memory 222 may be encoded on microprocessor 226.

Figure 3:
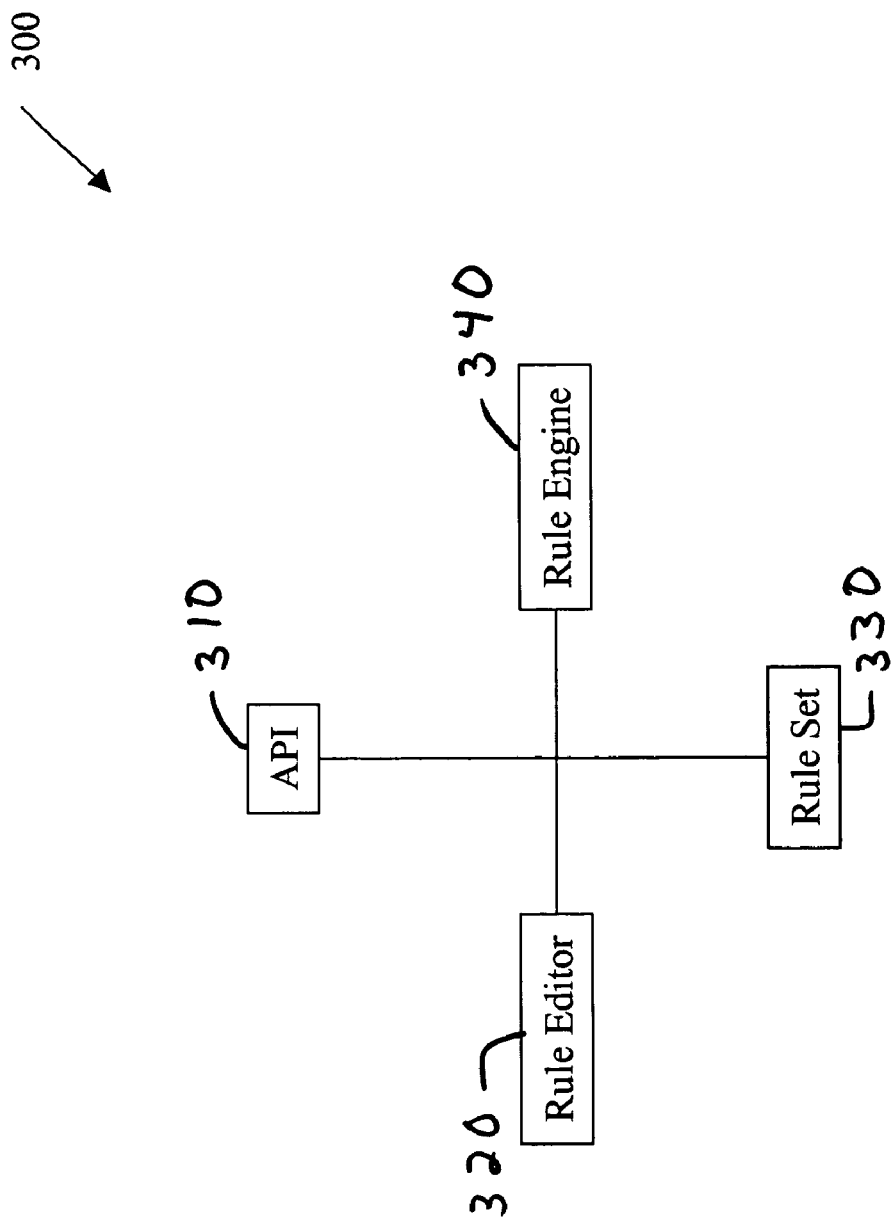
FIG. 3 is a block diagram illustrating a framework for a rule database.

FIG. 3 illustrates a framework 300 that may be used to implement a rule database similar to rule database 223 in FIG. 2. Framework 300 includes an application program interface (API) 310, a rule editor 320, a rule set 330, and a rule engine 340. API 310 is responsible for interfacing rule editor 320 and rule engine 340 with typical wireless telephone functions. API 310 may also serve as an interface for software developers and as an interface for lower level sensor signal processing. Rule editor 320 is responsible for modifying the rules in rule set 330. Modification may include adding, deleting, and/or editing rules. Rule engine 330 is responsible for receiving representations of environmental states, determining whether the environmental states satisfy a rule in rule set 330, and initiating a communication if a rule is satisfied. Rule engine 330 may also handle subscriptions and serve as an interface to the sensors.

In operation, alert sensor rules are first written into rule set 330 using rule editor 320. For example, a rule may be added to send a communication to a wireless telephone when sound above a certain level is detected, with the condition and the responsive communication being examples of rule parameters. An example of such a rule in Extensible Markup Language (XML) format is:

```
<sensor>
   <voice>
      <over>80</over>
   </voice>
   <smsto>+358 40 7681967</smsto>
</sensor>.
```

Rule editor 320 may allow modification of rule set 300 by any pre-registered wireless telephone. Typically, a registration implies that a rule is associated with the wireless telephone. For added security, however, a secure Subscriber Identity Module (SIM) may be required for modifying rule set 330.

Then, when a sensor detects an environmental state and generates a signal representative of that state, a representation of the environmental state may be introduced to rule engine 340. The signal, for example, may be converted to a proposition by the sensor that detected the environmental state, a processor of the wireless device, API 310, or any other appropriate entity. An example of a proposition regarding sound in XML format is:

```
<voice>92</voice>.
```

Rule engine 340 then determines whether any rules satisfy the environmental state and, if so, generates output regarding the appropriate action. For example, for the above-illustrated proposition and rule, the rule engine 340 may output the following communication command in XML format:

```
<alert>
   <smsto>+358 40 7681967</smsto>
</alert>.
```

API 310 is then responsible for conveying this communication command to the communication portion of the wireless device for conveyance to the identified wireless device. Note that the rules, propositions, and communication commands may be specified by document type definition (DTD).

API 310 may be the Nokia User Interface (UI) API. This API gives application developers access to certain basis telephone functionality, such as, for example, vibration, display lighting, and graphics-related enhancements. Rule engine 340 may be built upon Java 2 Platform Micro Edition (J2ME), Personal Java, or any other appropriate platform. Furthermore, the rule engine may be based on Mobile Information Device Profile (MIDP) 2.0 and Connected Limited Device Configuration (CLDC) 1.0. For example, Nokia Developer's Suite for J2ME™, Version 1.1 for Linux Series, which is a development environment for J2ME applications such as the Nokia Series 40 MIDP Concept SDK, could be used as a standalone or as a plug-in to Jbuilder 8 or Sun ONE Studio 4, Mobile Edition to develop a wireless telephone package Additional features include integrated application deployment to an FTP server, as well as an audio converter of MIDI tones.

Furthermore, Extensible Hypertext Markup Language-Mobile Profile (XHTML MP) may be used to modify rule set 330 with a new rule. XHTML MP may be used to find the rules that are results of feeding sensor-based propositions to the rule set and finding output XML propositions. As an XML-based standard, XHTML MP enables the automatic parsing and transforming of content through the use of Extensible Style-Sheet Language Transformation (XSLT), which uses a style sheet to describe a set of rules for transforming a source XML document into a result XML document, or other XML tools, such as, for example, XET, which allows direct, succinct, and efficient computation of and reasoning with both explicit and implicit XML elements without necessity for data conversion. If security is a concern, a secure Subscriber Identification Module (SIM) may be used with the wireless telephones.

Framework 300 has a variety of features. For example, because the framework may be implemented on wireless telephones that have J2ME, the framework is able to be widely used. Furthermore, the framework is extensible, allowing integration of a variety of sensors and combinations. Thus, wireless sensor alerts may be used widely to provide varied information, and upgrades may be readily performed. As another example, framework 300 allows a wireless device having a sensor to be programmed from most existing wireless telephones. Thus, a user may use wireless devices of different types together without having to be tied to one wireless service provider.

Figure 4:
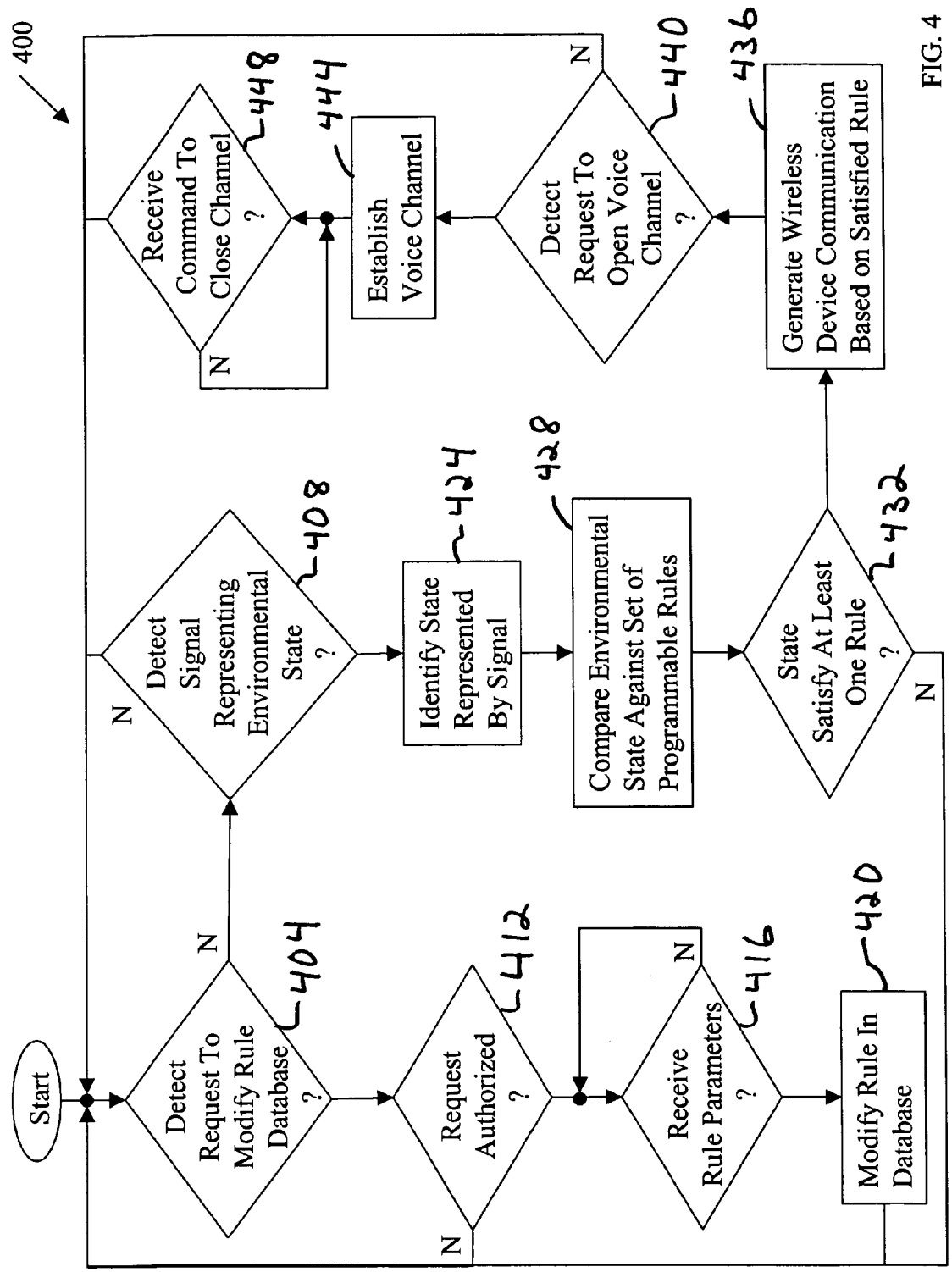
FIG. 4 is a flow chart illustrating a process for wireless sensor alerts.

FIG. 4 illustrates a process 400 that represents operations of a wireless device such as wireless telephone 110 in FIG. 1. The process begins with determining whether a request to modify a rule database has been received (step 404). A request to modify a rule database may involve adding a rule to the database, deleting a rule from the database, and/or editing a rule in the database. If a request to modify a rule database has not been received, a determination is made as to whether a signal representing an environmental state has been detected (step 408). A signal representing an environmental state may be a signal produced by a sensor, such as, for example, a microphone or motion detector, a communication that represents a signal produced by a sensor, or any other appropriate signal. If a signal representing an environmental state has not been detected, the process calls for returning to check for a request to modify a rule database.

The process may continue to wait at steps 404–408 for an appropriate request and/or signal.

Once a request to modify a rule database has been detected, the process continues with determining whether the request is authorized (step 412). Determining whether a request is authorized may be accomplished, for example, by determining whether the device that initiated the request is authorized. Devices may be authorized by having their identifiers pre-registered, by answering a challenge in a challenge-response protocol, or by any other technique. The device that initiated the request may be, for example, a wireless telephone.

If the request is not authorized, the process call for returning to check for a request to modify a rule database. If, however, the request is authorized, the process calls for waiting to receive rule parameters (step 416). Rule parameters may include a description of a rule, a condition for the rule, and the responsive communication of the rule. Once rule parameters have been received, a rule in the rule database is modified (step 420). The process then returns to check for an additional request to modify the rule database.

If a signal representing an environmental state has been detected (step 408), an environmental state represented by the signal is identified (step 424). Identifying an environmental state may include, for example, determining the type of environmental condition—sound, temperature, motion, position, airborne particulates, or any other appropriate condition—represented by the signal, and the level of the condition. The environmental state is then compared against a set of programmable rules in a rule database (step 428).

A determination is then made as to whether the state satisfies at least one of the rules (step 432). If the state does not satisfy at least one of the rules, the process calls for returning to check for a request to modify a rule database. If, however, the state satisfies at least one of the rules, a communication is generated for a wireless device based on the satisfied rule (step 436). The communication may then be sent to a wireless network for conveyance to the wireless device.

A determination is then made as to whether a request to open a voice channel has been detected (step 440). If a request to open a voice channel has not been detected, the process checks again for a request to modify the rule database (step 404). If, however, a request to open a voice channel has been detected, the process establishes a voice channel (step 444). The process then waits to receive a command to close the voice channel (step 448). Once such a command has been received, the process checks again for a request to modify a rule database (step 404).

FIG. 4 illustrates a particular process for wireless sensor alerts. Other processes for wireless sensor alerts may have fewer, additional, and/or a different arrangement of operations. For example, a process may not have a technique for modifying a rule database. The technique may, however, be in another process. As another example, a state may satisfy more than one rule and/or multiple responsive communications may be specified in a rule. Thus, communications may have to be generated for multiple wireless devices. As a further example, a process may call for opening a communication channel to a wireless device instead of sending a communication. As an additional example, instead of a request to open a voice channel, a request may be to open a one-way voice channel (i.e., from the alerting device to the alerted device). As another example, a request may be received and executed to send communications representing states detected by other wireless device sensors.

Figure 5:
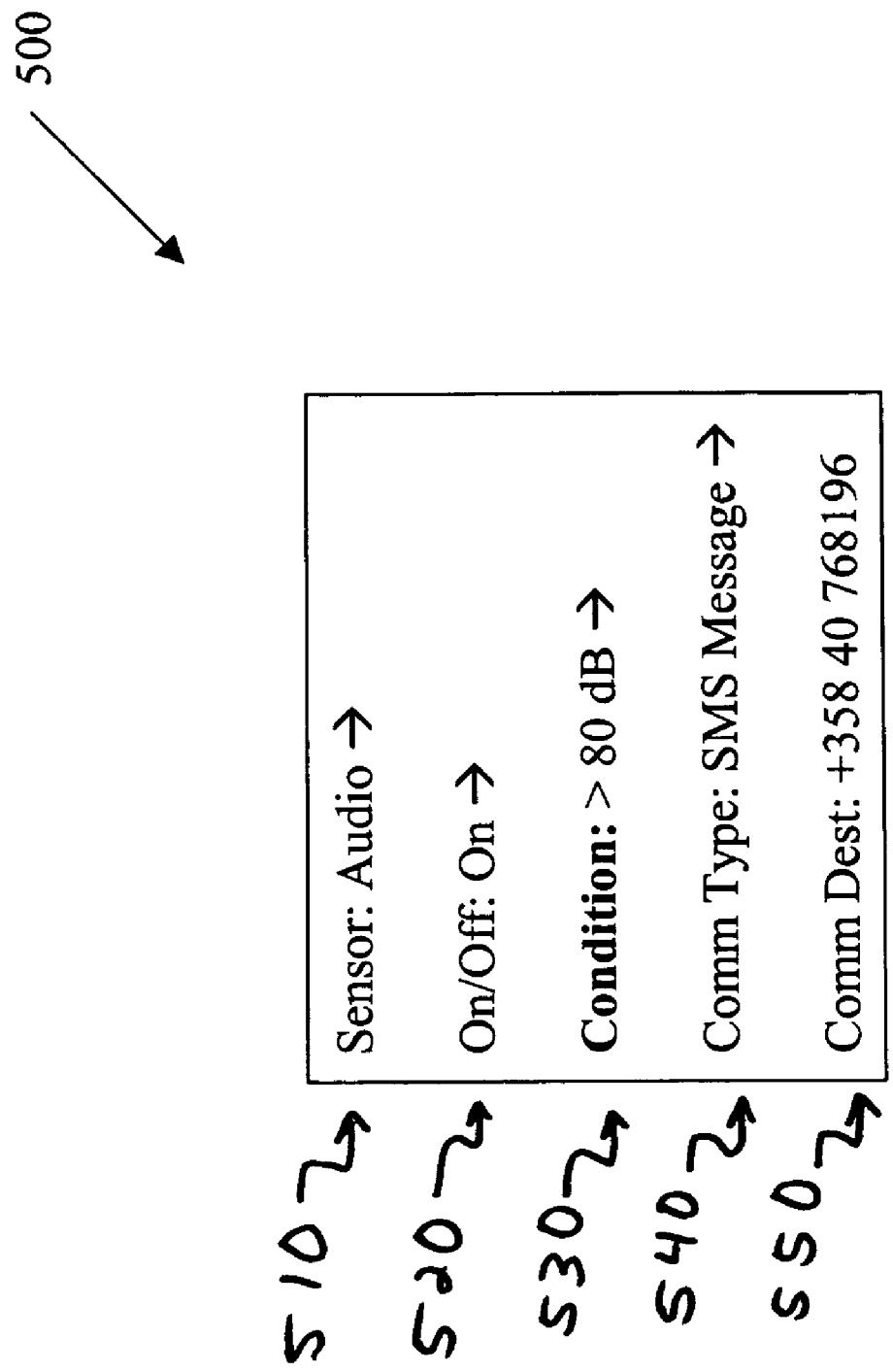
FIG. 5 illustrates a user interface for programming wireless sensor alerts.

FIG. 5 illustrates a user interface 500 for programming wireless sensor alerts. That is, user interface 500 allows rules for wireless sensor alerts to be programmed. User interface 500 may be visually presented by a wireless telephone, a PDA, a PC, or any other appropriate device.

As illustrated, user interface 500 includes sections 510–550 for use in specifying parameters for a rule. These sections include a sensor selection section 510, a rule activation section 520, a condition section 530, a communication type section 540, and a communication destination section 550, sections 510–550 specifying parameters for a rule. A user may move between sections 510–550 using, for example, up and down keys on a keypad, and may select information in a section by using left and right keys of the keypad, where "→" in FIG. 5 indicates that additional selections are available, or by activating alphanumeric keys on the keypad.

By specifying information in sections 510–550, the rules for sending alerts from a wireless device having one or more sensors may be controlled. In section 510, the type of sensor to which a rule is to apply may be selected. The types of sensors may include, for example, audio, smoke, and motion.

In section 520, the rule may be activated or deactivated. The ability to deactivate a rule may be beneficial if a wireless device is continuing to send alerts that are false, possibly due to a malfunctioning sensor, or alerts of which a user of a receiving device is already aware.

In section 530, the condition for a rule may be specified. As illustrated, an alert is to be generated if the audio sensor detects a signal above 80 dB. Conditions other than threshold conditions may be appropriate for other types of sensors.

In section 540, the type of communication to be sent if the condition is satisfied is specified. Communications may include text messages, opening communication channels, or any other appropriate type of communication.

Finally, in section 550, the destination for the communication may be specified. In this example, the destination is illustrated as a telephone number. But the destination could be a computer network address, a pager identification number, or another appropriate identifier.

In one implementation, programming wireless sensor alerts using a user interface like user interface 500 may be performed from a wireless telephone that has been granted access rights. When a user initially acquires the ability to send wireless sensor alerts from a wireless telephone, perhaps by downloading appropriate software from a Web-site, the user may be registered as a super user. For example, the user may have full subscription rights, full rule editing rights, full rights to modify access control lists, and other similar rights. The user may grant some or all of these rights to other wireless telephone users, which may be identified on the basis of Electronic Serial Number (ESN), Mobile Identification Number (MIN), SIM Card, passwords, and/or other appropriate identifiers.

In operation, if a user wants to subscribe to and/or modify a rule for an alerting wireless telephone to which the user has been granted access, the user's information is authorized against a database of the alerting wireless telephone using one or more identifiers. If authorized, the rules in the database may be edited. The rule parameters may be sent using any appropriate wireless messaging protocol, such as, for example, SMS. Possible reply messages include: 1) successful update; 2) erroneous XML message; and/or 3) unauthorized access message. Note that a text message sent without a secure SIM may work, but that a warning about security may be returned, possibly as a text message.

For WAP-enabled devices, an authorized user may be able to operate directly with forms on a Web-site. Or, if the alerting wireless telephone supports Bluetooth™ or an infrared standard, such as, for example, one from the Infrared Data Association (IrDA), the subscription may be established and/or modified using a compatible personal computer (PC). In general, therefore, any technique may be used for modifying a rule in the rule database, as well as subscribing to a service, of an alerting wireless telephone, as long as the access rights have been granted.

On alert, if the alerted wireless telephone has capabilities beyond basic text messaging, any required style sheets may be sent from the alerting wireless telephone. However, if the wireless telephone type is not automatically detected, the subscribing user may use an API of the alerting wireless telephone to edit the default UI style sheet on a wireless telephone by wireless telephone basis. Then, the correct UI may be sent or downloaded from the alerting wireless telephone. Additionally, the correct UI may be downloadable from a Web-site. The font, language, and other related settings may be covered by the API.

Although FIG. 5 illustrates a user interface for wireless sensor alerts, other user interfaces may have fewer, additional, and/or a different arrangement of components. For example, a user interface may not allow a rule to be activated and deactivated. With such an interface, a rule will need to be deleted in situations where the rule is not desired. As another example, the user interface may contain pull-down menus, radio buttons, or any other type of selection technique for specifying information. As an additional example, a user interface may allow more than one communication destination to be specified for a rule. As a further example, a user interface may allow a variety of conditions to be specified for a rule. For instance, a rule may specify that an alert is to be sent if the temperature level is over 90° F. and a smoke sensor has activated.

A number of implementations have been described. Other implementations are within the scope of the following claims.

What is claimed is:

1. A method performed at a wireless device, the method comprising:
    detecting a signal representing an environmental state in the vicinity of the wireless device;
    comparing the environmental state represented by the signal against a set of remotely programmable rules at the wireless device;
    if the environmental state satisfies at least one of the rules; generating, based on the satisfied rule, a communication for transmission to a wireless network;
    detecting a request to modify the programmable rules;
    determining whether parameters for a rule have been received; and
    if the parameters have been received, modifying the rules, wherein modifying the rules comprises adding a new rule based on the received parameters.

2. The method of claim 1, further comprising:
    detecting the environmental state; and
    generating the signal representing the environmental state.

3. The method of claim 1, wherein the signal represents sound level.

4. The method of claim 1, further comprising identifying the environmental state represented by the signal.

5. The method of claim 4, wherein identifying the environmental state represented by the signal comprises:
    determining an environmental condition associated with the state; and
    determining a level of the environmental condition.

6. The method of claim 1, wherein at least one of the rules comprises multiple conditions that must be satisfied.

7. The method of claim 1, wherein the communication comprises a Short Message Service message.

8. The method of claim 1, wherein the communication is destined for a second wireless device.

9. The method of claim 1, wherein at least one of the rules specifies a level that an environmental state must exceed for the rule to be satisfied.

10. The method of claim 1, wherein the request is from a second wireless device.

11. The method of claim 1, further comprising:
    detecting a request to open a voice channel in response to the communication; and
    establishing the voice channel using the wireless device.

12. The method of claim 1, wherein at least one of the rules specifies multiple communications for an environmental state.

13. The method of claim 1, wherein the wireless device comprises a cellular telephone.

14. A wireless device comprising:
    a sensor operable to detect an environmental state in the vicinity of the wireless device and to generate a signal representing the environmental state;
    a processor coupled to the sensor, the processor operable to:
        detect the signal representing the environmental state,
        compare the environmental state represented by the signal against a set of remotely programmable rules,
        if the environmental condition satisfies at least one of the rules, generate, based on the satisfied rule, a communication for transmission to a wireless networks,
        detect a request to modify the programmable rules,
        determine whether parameters for a rule have been received, and
        if the parameters have been received, modify the rules, wherein modifying the rules comprises adding a new rule based on the received parameters; and
    a transceiver coupled to the processor, the transceiver operable to wirelessly send the communication.

15. The wireless device of claim 14, further comprising:
    an audio input device coupled to the processor, the audio input device operable to detect a user's voice and to generate a signal representative thereof;
    an audio output device coupled to the processor, the audio output device operable to receive a signal representative of sound and to generate sound representative thereof;
    a visual output device coupled to the processor, the visual output device operable to receive a signal representative of visual information and to generate visual information representative thereof; and
    a user-manipulable input device coupled to the processor, the user-manipulable input device operable to detect user manipulation thereof and to generate a signal representative thereof.

16. The wireless device of claim 14, wherein the processor is further operable to identify the environmental state represented by the signal.

17. The wireless device of claim 16, wherein the processor is operable to determine an environmental condition associated with the environmental state and to determine a level of the environmental condition to identify the environmental state represented by the signal.

18. The wireless device of claim 14, wherein at least one of the rules specifies a level that an environmental state must exceed for the rule to be satisfied.

19. The wireless device of claim 14, wherein the processor is further operable to:
   detect a request to open a voice channel in response to the communication; and
   establish the voice channel using the wireless device.

20. The wireless device of claim 14, wherein at least one of the rules comprises multiple conditions that must be satisfied.

21. The wireless device of claim 14, wherein the communication is destined for a second wireless device.

22. The wireless device of claim 14, wherein the wireless device comprises a cellular telephone.

23. An article comprising a machine-readable medium storing instructions operable to cause one or more machines to perform operations comprising:
   determining whether a signal representing an environmental state in the vicinity of a wireless device has been detected at the wireless device;
   comparing the environmental state represented by the signal against a set of remotely programmable rules at the wireless device;
   if the environmental state satisfies at least one of the rules, generating, based on the satisfied rule, a communication for transmission to a wireless network;
   detecting a request to modify the programmable rules;
   determining whether parameters for a rule have been received; and
   if the parameters have been received, modifying the rules, wherein modifying the rules comprises adding a new rule based on the received parameters.

24. The article of claim 23, wherein the instructions are further operable to cause one or more machines to perform operations comprising identifying the environmental state represented by the signal.

25. The article of claim 24, wherein identifying the environmental state represented by the signal comprises:
   determining an environmental condition associated with the state; and
   determining a level of the environmental condition.

26. The article of claim 23, wherein at least one of the rules comprises multiple conditions that must be satisfied.

27. The article of claim 23, wherein the communication is destined for a second wireless device.

28. The article of claim 23, wherein at least one of the rules specifies a level that an environmental state must exceed for the rule to be satisfied.

29. The article of claim 23, wherein the instructions are further operable to cause one or more machines to perform operations comprising:
   detecting a request to open a voice channel in response to the communication; and
   establishing the voice channel using the wireless device.

30. A framework for wireless sensor alerts, the framework comprising:
   a rule set comprising programmable rules that specify conditions under which communications are to be sent based on an environmental state in the vicinity of a wireless device and the communications to be sent;
   a rule engine operable to:
      receive a proposition for a rule, the proposition representing an environmental state in the vicinity of a wireless device,
      compare the proposition against the rules, and
      if the proposition satisfies a condition of at least one of the rules, determine, based on the satisfied rule, a communication for transmission to a wireless network; and
   a rule editor operable to modify the rules in the rule set based on received rule parameters, the operations comprising:
      detecting a request to modify the programmable rules;
      determining whether parameters for a rule have been received; and
      if the parameters have been received, modifying the rules, wherein modifying the rules comprises adding a new rule based on the received parameters.

31. The framework of claim 30, wherein the environmental state comprises an environmental condition and a level of the environmental condition.

32. The framework of claim 30, wherein at least one of the rules has multiple conditions that must be satisfied.

33. The framework of claim 30, wherein the communication is destined for a second wireless device.

34. The framework of claim 30, wherein at least one of the rules specifies a level that an environmental state must exceed for the rule to be satisfied.

35. A system for wireless sensor alerts, the system comprising:
   a wireless network operable to receive communications from and send communications to wireless telephones;
   a first wireless telephone operable to wirelessly send communications to and receive communications from the wireless network, the wireless telephone comprising:
      a sensor operable to detect an environmental state in the vicinity of the wireless telephone and to generate a signal representative thereof,
      a microprocessor coupled to the sensor, the microprocessor operable to:
         detect the signal;
         generate a rule proposition based on the signal, the proposition specifying an environmental condition and level associated with the state;
         compare the rule proposition to rules in a remotely programmable rule database to determine whether the proposition satisfies a condition of a rule;
         if the proposition satisfies a condition of a rule, determine, based on the satisfied rule, a message for communication to a second wireless telephone;
         determine whether a communication regarding opening a voice channel in response to the message has been received from the second wireless telephone;
         if the communication has been received, open a voice channel to the second wireless telephone;
         detect a request to modify the programmable rules;
         determine whether parameters for a rule have been received; and
         if the parameters have been received, modify the rules, and
      a transceiver coupled to the processor, the transceiver operable to send the message to the wireless network; and
   the second wireless telephone, the second wireless telephone operable to wirelessly send communications to and receive communications from the wireless network, the wireless telephone operable to:

receive the message from the first wireless telephone,
visually present the message,
determine whether a user desires to open a voice channel to the first wireless telephone in response to the message,
if a user desires to open a voice channel in response to the message, send the communication regarding opening a voice channel to the wireless network for communication to the first wireless telephone,
visually present a user interface for modifying the rules,
detect user commands indicating parameters for a rule, and
send a communication containing the parameters to the wireless network for conveyance to the first wireless telephone.

* * * * *